(12) United States Patent
Kienle et al.

(10) Patent No.: US 11,701,604 B2
(45) Date of Patent: Jul. 18, 2023

(54) DEVICE AND METHOD FOR DETECTING WEAR OF A SEPARATING ELEMENT

(71) Applicant: BHS-Sonthofen GmbH, Sonthofen (DE)

(72) Inventors: Bernhard Kienle, Sonthofen (DE); Frieder Hassler, Sonthofen (DE); Detlef Steidl, Sonthofen (DE); Wolfgang Süss, Sonthofen (DE)

(73) Assignee: BHS-Sonthofen GmbH, Sonthofen (DE)

( * ) Notice: Subject to any disclaimer, the term of this patent is extended or adjusted under 35 U.S.C. 154(b) by 334 days.

(21) Appl. No.: 17/045,744

(22) PCT Filed: Apr. 2, 2019

(86) PCT No.: PCT/EP2019/058283
§ 371 (c)(1),
(2) Date: Oct. 6, 2020

(87) PCT Pub. No.: WO2019/193001
PCT Pub. Date: Oct. 10, 2019

(65) Prior Publication Data
US 2021/0052997 A1 Feb. 25, 2021

(30) Foreign Application Priority Data
Apr. 6, 2018 (DE) ................... 10 2018 205 237.9

(51) Int. Cl.
*B01D 33/067* (2006.01)
*B01D 33/80* (2006.01)

(52) U.S. Cl.
CPC ......... *B01D 33/067* (2013.01); *B01D 33/804* (2013.01)

(58) Field of Classification Search
CPC .. B01D 33/067; B01D 33/804; B01D 33/073; B01D 33/09; B01D 33/80; B01D 33/06; B01D 29/00; B01D 35/14
(Continued)

(56) References Cited

U.S. PATENT DOCUMENTS 2,741,369 A * 4/1956 Fest ................. B01D 33/09
                                                     210/392
2,899,068 A * 8/1959 King et al. ........... B01D 33/15
                                                     210/395
(Continued)

FOREIGN PATENT DOCUMENTS

CN     202460268 U    10/2012
DE        244877 C     6/1910
(Continued)

OTHER PUBLICATIONS

Indian Application No. 202017032628, First Examination Report (FER) dated Mar. 17, 2022, 8 pages.
(Continued)

*Primary Examiner* — Akash K Varma
(74) *Attorney, Agent, or Firm* — Kilpatrick Townsend & Stockton LLP

(57) ABSTRACT

The present invention relates to a rotary pressure filter comprising a filter drum, a housing, and at least one separating element which divides a process chamber in a gastight manner into a plurality of process portions. A sensor is arranged on the side of at least one separating element that faces the housing. The sensor comprises a coil and a rod which is arranged inside the coil. The rod is designed to be displaced in the coil on the basis of a change in the distance of the separating element from the sensor. The invention further relates to a method for detecting wear of a separating element of a rotary pressure filter.

20 Claims, 4 Drawing Sheets

(58) Field of Classification Search
    USPC ........................................................ 210/217
    See application file for complete search history.

(56) References Cited

U.S. PATENT DOCUMENTS

| | | | | |
|---|---|---|---|---|
| 3,320,680 | A | * | 5/1967 | Missbach ................ B29C 59/06 |
| | | | | 251/129.22 |
| 2009/0301529 | A1 | * | 12/2009 | Lundberg ................ D21C 9/02 |
| | | | | 134/115 R |
| 2010/0243185 | A1 | * | 9/2010 | Orgard .................... D21C 9/06 |
| | | | | 162/263 |

FOREIGN PATENT DOCUMENTS

| | | |
|---|---|---|
| DE | 19654165 C1 | 8/1998 |
| WO | 2006130093 A1 | 12/2006 |
| WO | 2009061247 A1 | 5/2009 |
| WO | 2009061247 A8 | 4/2010 |

OTHER PUBLICATIONS

Chinese Application No. 201980024354.0, Chinese Office Action dated Apr. 6, 2022, No English translation available, 6 pages.
German Application No. DE102018205237.9, "Search Report", dated Oct. 25, 2018, 7 pages.
International Application No. PCT/EP2019/058283, "International Search Report", dated Jul. 16, 2019, 5 pages.

* cited by examiner

DEVICE AND METHOD FOR DETECTING WEAR OF A SEPARATING ELEMENT

CROSS REFERENCE TO RELATED APPLICATION

This application claims priority to International Patent Application No. PCT/EP2019/058283, filed on Apr. 2, 2019, which claims priority to German Patent Application No. 10 2018 205 237.9, filed in Germany on Apr. 6, 2018. The entire contents of both applications are hereby incorporated herein by this reference.

The present invention relates to a rotary pressure filter comprising a filter drum which is designed to filter suspension to be filtered, a housing which surrounds the filter drum and in which the filter drum is rotatably mounted, a process chamber being arranged between the filter drum and the housing, and at least one separating element which is arranged between the housing and the filter drum such that said element divides the process chamber into a plurality of process portions in a gas-tight manner.

The applicant has been selling pressure filters for many years. In such rotary pressure filters, a suspension, which is a mixture of liquids and solids, is applied to a rotating filter drum. The filter drum is designed such that liquid from the suspension can pass through a wall of the filter drum, whereas solids from the suspension remain on a surface of the filter drum. As a result, a layer of solids, which experts refer to as "filter cake", forms on the surface of the filter drum.

The suspension or filter cake passes through different process zones, such as, for example, washing and drying zones, which are separated from one another in a gas-tight manner. What are referred to as separating elements are usually provided for this separation, and said elements extend from the housing through the process chamber to the filter drum and are pressed against the filter drum with a predetermined pressure. Since the filter drum moves beneath the separating elements, which are fixed in relation to the housing and press against the filter drum, wear occurs on the separating elements.

In order to ensure the functioning of the separating elements even with increasing wear, the separating elements are tracked accordingly in the direction of the filter drum. It is obvious that such tracking is only possible to a limited extent, and that the separating elements have to be replaced once a predetermined wear has been reached.

Until now, the wear of the separating elements had to be checked visually by trained personnel or had to be read off a mechanical sensor which could be difficult to access, depending on the arrangement of the separating element on the rotary pressure filter.

The problem addressed by the present invention is therefore that of providing a device and a method for detecting wear of a separating element, which device and method improve the convenience and/or accuracy of the reading process.

In a first aspect, this problem is solved according to the invention by a generic rotary pressure filter in which a sensor is arranged on the side of at least one separating element that faces the housing, which sensor comprises the following: a coil formed using an electrically conductive material and a rod made of a metal which is arranged inside the coil, the rod being designed to be displaced in the coil on the basis of a change in the distance of the separating element from the sensor.

According to the principle of induction, current is generated in the coil when the rod is displaced in the coil. In this case one end of the rod can be attached to the separating element, in particular to a surface of the separating element that faces the sensor, and the other end of the rod can extend freely into the coil. The free end of the rod can extend, for example in connection with a new separating element, to the end of the coil which points away from the separating element, or to the centre of the coil. For wear and tracking of the separating element, the free end of the rod is displaced towards the end of the coil pointing towards the separating element.

The separating elements can be made of a plastics material, in particular from a thermoplastics material having good sliding properties compared to steel running surfaces. The material can be selected depending on the usage conditions in terms of chemical resistance to the operating media and temperature resistance.

In particular, the separating elements can be made of PE (UHMW), PA, PTFE, in particular PTFE with carbon/graphite, PVDF (for example advantageously in the case of increased chemical stress) or PEEK (for example advantageously at high temperatures).

The current flowing through the electrically conductive material of the coil can be used to infer the displacement of the rod, i.e. the tracking path of the separating element, and thus the wear of the separating element.

The rod can be surrounded by a Teflon layer or another suitable layer which has a lower coefficient of friction than the material of the rod, in order to facilitate displacement of the rod in a mounting of the rod.

In order to be able to ensure reliable tracking of the rod, in particular in an arrangement in which tracking is to be carried out against gravity, the sensor can furthermore comprise a spring which pretensions the rod towards the separating element. The spring can be arranged such that it applies a corresponding force between the rod and part of the housing, which force pushes the rod towards the separating element. In this case, the spring can be designed as a compression spring. The compression spring can apply a spring force of, for example, 50 N to 160 N, corresponding to the wear of the separating element.

In a development of the present invention, the rod can be connected to a support element which is supported directly on the separating element or is supported on a unit, for example a membrane, arranged between the separating element and the support element. The rod can be inserted into the support element, for example forming a thread engagement. The support element can have an enlarged surface, for example a plate-shaped portion, at the end thereof facing the separating element. In this case, a spring arranged on the sensor can act on the plate-shaped portion of the support element, instead of on the rod.

The membrane arranged between the separating element and the housing can ensure that a gas seal is retained between the process zones separated by the separating element, particularly in the case of a severely worn and correspondingly tracked separating element. The enlarged contact surface of the support element, particularly when said element is arranged on a membrane, can prevent the membrane from being damaged.

It is also possible for the rod to be selectively connected to one of a plurality of support elements which differ, for example, in length, such that a total length of the combination of rod and support element can be varied depending on the selection of the support element connected to the rod.

The sensor can be arranged in a portion of the rotary pressure filter which is assigned to the same explosion hazard class as the process chamber of the rotary pressure filter, is advantageously arranged inside the process chamber of the rotary pressure filter, or is connected thereto in a pressure-transmitting manner. The use of sensors in the process chamber of a rotary pressure filter is usually very limited due to the regulations to be observed regarding explosion safety and the special ambient conditions. However, the particularly simple structure of the sensor according to the invention permits its use in surroundings in which there are high temperatures and/or high pressure and/or a high degree of soiling, for example due to solids contained in the air. An arrangement of the sensor in the process chamber of the rotary pressure filter can also simplify sealing of the housing of the rotary pressure filter. In the prior art, for example, a moving sensor must be guided from the separating element through the housing to an exterior of the housing and sealed appropriately in the housing, but must still be movably mounted. This usually requires a high degree of effort in terms of construction, costs, and/or approval. In the sensor according to the invention, only the current-carrying lines of the sensor can be guided through the housing, and these, as non-moving parts, can simply be sealed in the housing.

Typical ambient conditions in the process chamber of the rotary pressure filter are, for example, temperatures from 0° C. to 120° C. and pressures from 1-10 barg (at 0 barg pressure outside the housing). The process chamber of the rotary pressure filter is usually classified as an explosion hazard class or as an explosion hazard zone 0.

To support the induction effect of the rod in the coil, the rod can be made of a magnetic material. Of course, it is also possible for the rod to be made of a magnetisable or merely metal material.

In an advantageous development of the invention, the measuring region of the sensor can detect displacement of the rod by approximately 18 mm, in particular by approximately 22 mm. The separating elements of a rotary pressure filter according to the invention can consequently be designed to be shortened from an original length by approximately 18 mm. If this degree of wear is reached, the separating elements should be replaced with new separating elements. However, in order to be able to detect excessive wear, it can be advantageous to design the detectable measuring range of the sensor to be greater than a corresponding maximum wear, i.e. shortening, of the separating elements. This security region can be 4 mm or generally approximately 4% to 5% for the rotary pressure filter described herein.

Alternatively or in addition to the measurement of the current induced by the displacement of the rod in the coil, a resonant circuit can be applied to the coil, which is detuned when the rod is displaced in the coil. For example, a characteristic of the resonant circuit which is present in a new separating element and thus is present when a rod is initially arranged in the coil can be used as the standard condition. A degree of displacement of the rod, and therefore a corresponding displacement of the separating element, can be determined on the basis of a change in the characteristic of the resonant circuit resulting from displacement of the rod within the coil. Characteristics of the resonant circuit which are associated with predetermined displacement positions of the rod or changes in these characteristics with respect to one another can advantageously be stored in a memory unit. A current characteristic of the resonant circuit can then be compared to a stored characteristic in order to determine a position or displacement of the rod and thus of the separating element.

In particular for such an evaluation, the sensor can be electrically connected to an evaluation unit which is arranged outside an explosion hazard zone of the process chamber of the rotary pressure filter. The evaluation unit can include, for example, the memory unit mentioned above. A current or signal output by the coil of the sensor can be processed in the evaluation unit such that displacement of the separating element, and thus wear of the separating element, can be determined. The arrangement of the evaluation unit outside the explosion hazard zone of the process chamber of the rotary pressure filter can make it possible to use an evaluation unit which might not be available if the evaluation unit were to be arranged within the explosion hazard zone of the process chamber of the rotary pressure filter. The evaluation unit can thus typically be arranged in a zone in which there is no explosion hazard.

To separate the sensor from the evaluation unit, it can be advantageous for a Zener barrier to be arranged between the sensor and the evaluation unit. A Zener barrier can prevent the ignitability of the circuit on the side of the Zener barrier that comprises the sensor.

In a second aspect, the present invention relates to a method for detecting wear of a separating element of a rotary pressure filter which comprises a filter drum, by means of which suspension to be filtered is filtered, a housing which surrounds the filter drum and in which the filter drum is rotatably mounted, a process chamber being formed between the filter drum and the housing, and at least one separating element which is arranged between the housing and the filter drum such that the separating element divides the process chamber into a plurality of process portions in a gas-tight manner, characterised in that a sensor is arranged on the side of at least one separating element that faces the housing, which sensor comprises a coil formed using an electrically conductive material and a rod made of a metal which is arranged inside the coil, the rod being displaced in the coil on the basis of a change in the distance of the separating element from the sensor.

With regard to the advantages and possible embodiments of the method according to the invention, reference is made at this point to the embodiments of the inventive device of the rotary pressure filter.

In a development of the present invention, the method for measuring displacement of the rod, and thus displacement of the separating element, can be designed such that, due to the displacement of the rod in the coil, current flows in the electrically conductive material the coil is made of, or such that a resonant circuit is applied to the coil and is detuned when the rod is displaced in the coil.

Also in this regard, reference is explicitly made to the corresponding description of the rotary pressure filter.

The sensor can advantageously be connected to an evaluation unit which can determine displacement of the rod or of the separating element on the basis of the measured current or the measured resonant circuit detuning. The evaluation unit can in this case compare the measured current or the measured resonant circuit detuning with correspondingly known values which are stored, for example, in a memory unit of the evaluation unit, in order to thus be able to determine displacement or a position of the rod, and thus displacement or wear of the separating element.

The evaluation unit can in this case output a signal that indicates displacement of the separating element and/or a degree of wear of the separating element and/or a remaining wear path of the separating element and/or a remaining operating time of the separating element and/or a notification regarding replacement of the separating element. This signal can, for example, be continuously output to a display unit which graphically and/or acoustically displays at least one of the above-mentioned items of information. In particular, when the separating element has reached a level of wear at which the separating element is to be replaced, the display unit can be activated and can, for example, output a warning signal to a user of the rotary pressure filter.

Finally, it should be mentioned that the sensor structure according to the invention can also be used in other portions of the rotary pressure filter, for example for monitoring a fill level of a lubricant reservoir or for monitoring wear of stuffing box packing.

The invention will be described in greater detail below with reference to the accompanying drawings, in which.

Figure 1:
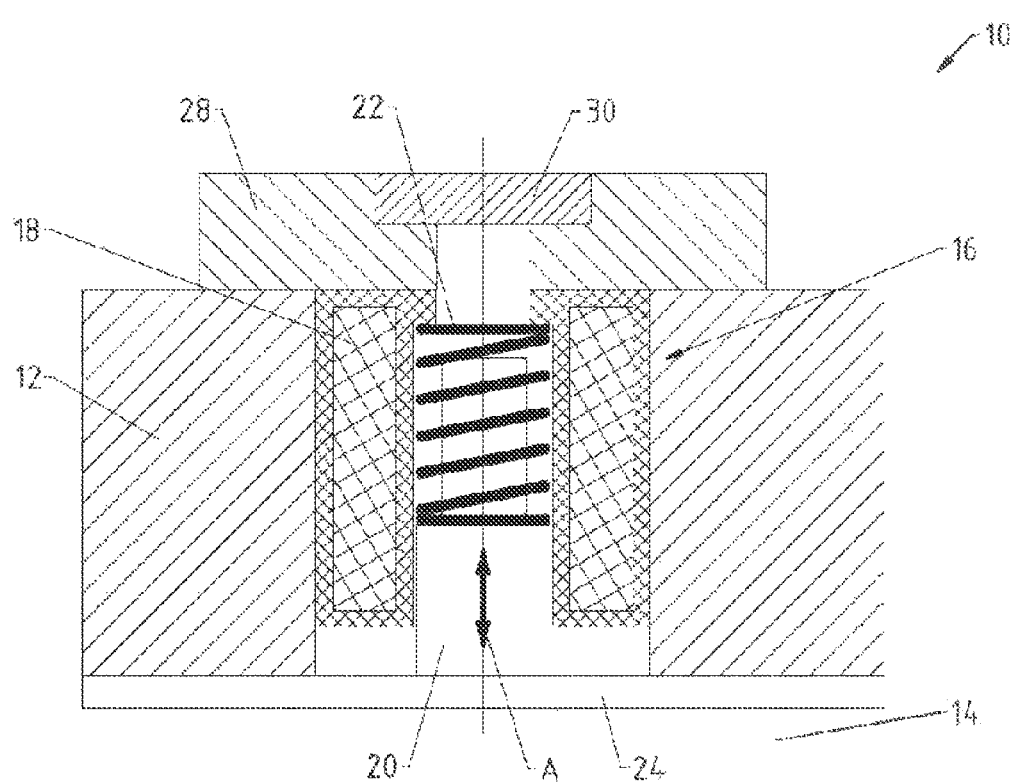
FIG. 1 is a lateral cross-sectional view of a schematic representation of the operating principle for a sensor arrangement on a rotary pressure filter.

FIG. 1 shows a rotary pressure filter according to the invention, which is generally denoted by reference numeral 10. The rotary pressure filter 10 comprises a housing 12 which surrounds a filter drum and in which the filter drum is rotatably mounted. A process chamber 14 is formed between the filter drum and the housing 12 of the rotary pressure filter 10, in which pressure chamber there is a higher pressure than on an exterior of the housing 12.

A sensor 16 is arranged at a through-opening of the housing 12, which comprises a coil 18 and a rod 20 arranged at least partially inside the coil. The rod 20 is in this case made of a magnetisable metal.

The rod 20 is movably mounted inside the coil 18, in particular along a direction of the central axis of the coil 18 (see arrow A). The rod 20 is pretensioned towards a membrane 24 by a spring 22, such that the rod 20 remains in contact with the membrane 24 even when the latter is displaced along the direction of the arrow A. On its side facing away from the rod 20, the membrane 24 is in contact with a separating element 26 (see FIG. 3), which in turn presses against the filter drum of the rotary pressure filter.

The opening of the housing 12 is sealed off from the outside by a cover 28 which comprises a pressure-resistant cable bushing 30. An electrical conductor to which the coil 18 is connected can be guided out of the housing through the pressure-resistant cable bushing 30.

If the separating element 26 undergoes wear, the side of the separating element 26 that faces the sensor 16, and thus the membrane 24, is moved away from said sensor. Accordingly, the rod 20 is displaced in the coil 18 so that current is induced in the coil 18, i.e. in the electrically conductive material of the coil 18. This current can be used as the basis for determining the displacement of the separating element 26.

Figure 2:
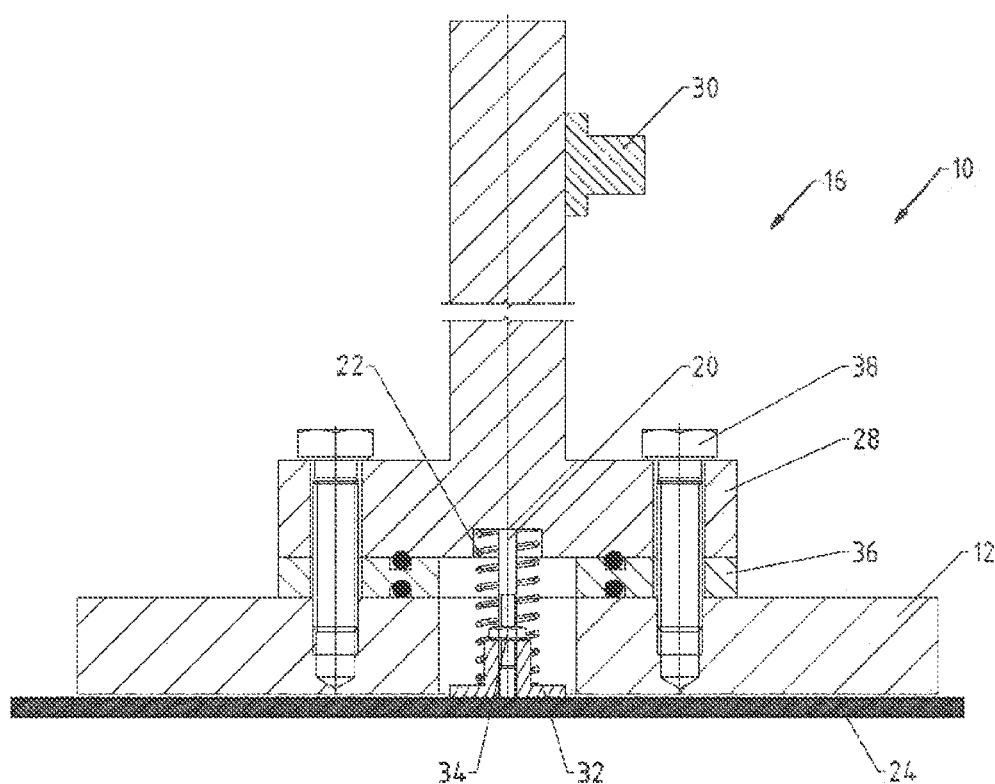
FIG. 2 is a schematic, lateral cross-sectional view of a first embodiment of the sensor arrangement on the rotary pressure filter.

FIG. 2 shows a first embodiment of the sensor arrangement 16, which is based on the principle described with reference to FIG. 1. Here, too, an opening is provided in the housing 12 of the rotary pressure filter 10, in which opening the rod 20 is arranged. The coil 18 is positioned here in a cylindrical widened portion of the cover 28. The pressure-resistant cable bushing 30 can be seen at the upper right-hand end of FIG. 2.

In contrast to FIG. 1, the rod 20 according to the embodiment of FIG. 2 is not formed in one piece, but rather comprises a support element 32 which engages with the rod 20 and which is connected at the side thereof that faces away from the rod 20 to the membrane 24. In the embodiment shown in FIG. 2, the end of the rod 20 that faces the membrane 24 comprises a thread onto which a nut 34 is screwed. Depending on the position of the nut 34 on the rod 20, an immersion depth of the rod 20 into the support element 32, and thus an overall length of the combination of rod 20 and support element 32, can be set. The spring 22 described with reference to FIG. 1 acts between the cover 28 and the support element 32.

Due to the material thickness of the housing 12, an intermediate element 36 is arranged here between the housing 12 and the cover 28, which is used to increase the distance between the cover 28 and the membrane 24.

The sensor 16 is screwed to the housing 12, through the cover 28 and the intermediate element 36, by screws 38.

Reference is moreover made to the description with reference to FIG. 1.

Figure 3:
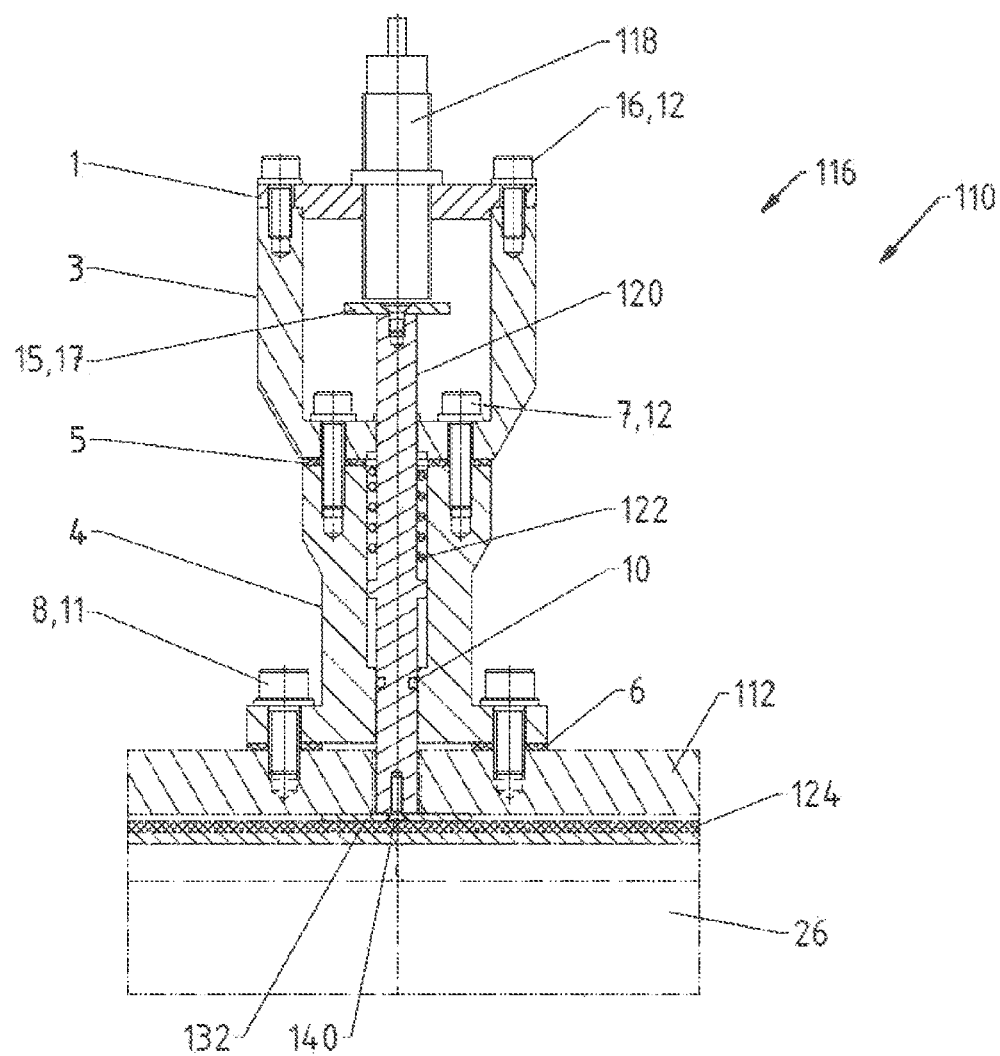
FIG. 3 is a schematic, lateral cross-sectional view of a second embodiment of the sensor arrangement on the rotary pressure filter.

FIG. 3 shows a second embodiment of the sensor arrangement 16 according to FIG. 2, which differs only slightly from the embodiment according to FIG. 2, so that analogous components are provided with the same reference numbers as in FIG. 2, but increased by 100.

With regard to the features of the embodiment according to FIG. 3, reference is explicitly made at this point to the descriptions relating to FIGS. 1 and 2.

In FIG. 3, a sensor arrangement 116 or a sensor 16 is arranged on a housing 112 of a rotary pressure filter 110. The sensor arrangement 116 comprises a rod 120 which is mounted such that it can be displaced relative to a coil 118. A spring 122 pushes the rod 120 towards a membrane 124, which in turn is connected to the separating element 26.

A support element 132, which is designed here as a cylindrical disc, is connected to the rod 120 as a contact surface between the rod 120 and the membrane 124. The support element 132 here is screwed to the rod 120 by a screw 140.

Figure 4:
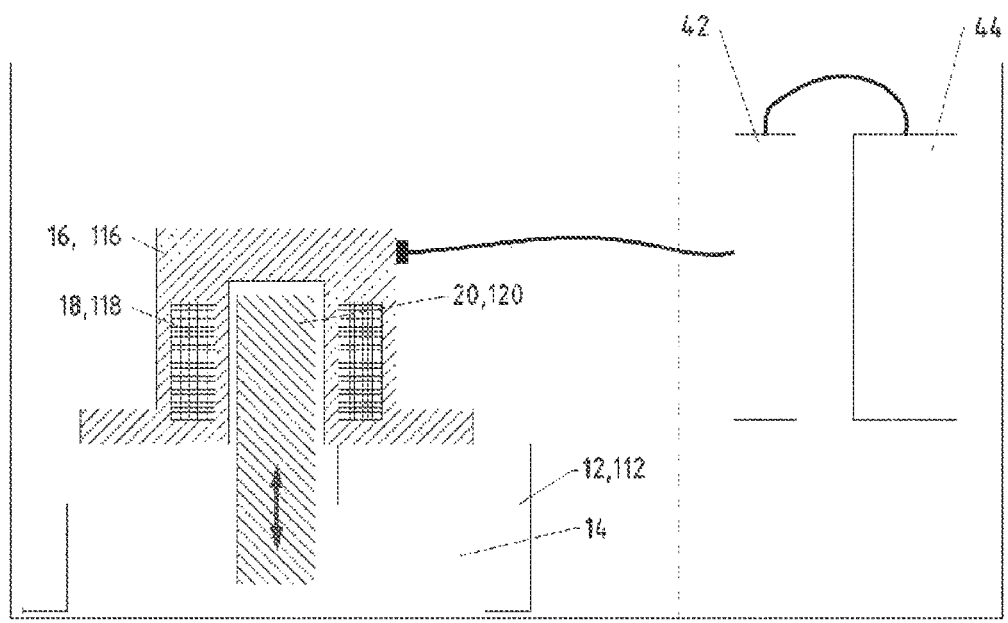
FIG. 4 is a schematic representation of the sensor arrangement and the evaluation unit according to the present invention.

In FIG. 4, the sensor arrangement 16 or 116 arranged on the housing 12 or 112 of the rotary pressure filter 10 or 110 and comprising a coil 18 or 118 and a rod 20 or 120 is only shown schematically.

The region arranged in the housing 12 or 112, i.e. the process chamber 14, forms an explosion hazard class or an explosion hazard zone 0 due to the ambient conditions prevailing there. The region immediately surrounding the exterior of the housing 12 or 112 forms an explosion hazard zone 1, since here too, there may occasionally be ambient conditions in which there is a risk of explosion. An evaluation unit 44 is electrically connected to the sensor 16 or 116 via a Zener barrier 42. The evaluation unit 44, due to the electrical interposition of the Zener barrier 42 and due to the spatial arrangement, is positioned outside the explosion hazard zone 1 in a region in which there is no risk of explosion and thus no requirement for the explosion safety of the components located there. The evaluation unit 44 processes the signals output by the sensor 16 or 116 and determines displacement and/or wear of the corresponding separating element 26 on the basis thereof.

The invention claimed is:

1. A rotary pressure filter comprising:
    a filter drum designed to filter a suspension;
    a housing which surrounds the filter drum and in which the filter drum is rotatably mounted, a process chamber being formed between the filter drum and the housing;
    a separating element arranged between the housing and the filter drum such that said separating element divides the process chamber into a plurality of process portions in a gas-tight manner; and
    a sensor arranged on a side of the separating element that faces the housing, wherein the sensor comprises an electrically conductive coil and a metal rod arranged inside the electrically conductive coil, wherein the metal rod is configured to be displaced in the electrically conductive coil based on a change in a distance of the separating element from the sensor;
    wherein a resonant circuit is coupled to the electrically conductive coil, the resonant circuit being configured to be detuned when the metal rod is displaced in the electrically conductive coil.

2. A rotary pressure filter according to claim 1, wherein the sensor further comprises a spring (22, 122) which pretensions the metal rod in a direction of the separating element (26).

3. A rotary pressure filter according to claim 1 wherein the metal rod is connected to a support element which is supported on the separating element.

4. A rotary pressure filter according to claim 1 wherein the sensor is arranged in a portion of the rotary pressure filter which is assigned to a same explosion hazard class as the process chamber of the rotary pressure filter.

5. A rotary pressure filter according to claim 1 wherein the metal rod is produced from a magnetic material.

6. A rotary pressure filter according to claim 1 wherein a measuring range of the sensor detects a displacement of the metal rod by approximately 18 mm.

7. A rotary pressure filter according to claim 1 wherein the sensor is electrically connected to an evaluation unit arranged outside an explosion hazard zone of the process chamber of the rotary pressure filter.

8. A rotary pressure filter according to claim 7, wherein a Zener barrier is arranged between the sensor and the evaluation unit.

9. A rotary pressure filter according to claim 1, wherein current flows in the electrically conductive coil due to a displacement of the metal rod in the electrically conductive coil.

10. A rotary pressure filter according to claim 1, wherein the sensor is connected to an evaluation unit, the evaluation unit being configured to determine displacement of the metal rod based on a measured current.

11. A rotary pressure filter according to claim 10, wherein the evaluation unit outputs a signal that indicates the displacement of the metal rod.

12. A rotary pressure filter according to claim 1, wherein the metal rod is connected to a support element which is supported on a membrane arranged between the separating element and the support element.

13. A rotary pressure filter according to claim 1, wherein the sensor is arranged inside the process chamber of the rotary pressure filter.

14. A rotary pressure filter according to claim 1, wherein the sensor is connected to the process chamber in a pressure-transmitting manner.

15. A rotary pressure filter according to claim 5, wherein a measuring range of the sensor detects a displacement of the metal rod by approximately 22 mm.

16. A rotary pressure filter according to claim 1, wherein the sensor is connected to an evaluation unit, the evaluation unit configured to determine the change in the distance of the separating element from the sensor based on a detuning of a measured resonant circuit.

17. A rotary pressure filter according to claim 16, wherein the evaluation unit outputs a signal that indicates a degree of wear of the separating element.

18. A rotary pressure filter according to claim 16, wherein the evaluation unit outputs a signal that indicates at least one of a remaining wear path or a remaining operating time of the separating element.

19. A rotary pressure filter according to claim 16, wherein the evaluation unit outputs a signal that indicates a notification regarding replacement of the separating element.

20. A method for detecting wear of a separating element of a rotary pressure filter, the rotary pressure filter comprising:
    a filter drum designed to filter a suspension;
    a housing which surrounds the filter drum and in which the filter drum is rotatably mounted, a process chamber being formed between the filter drum and the housing;
    the separating element arranged between the housing and the filter drum such that said separating element divides the process chamber into a plurality of process portions in a gas-tight manner; and
    a sensor arranged on a side of the separating element that faces the housing, wherein the sensor comprises an electrically conductive coil and a metal rod arranged inside the electrically conductive coil;
    wherein the method comprises displacing the metal rod in the electrically conductive coil based on a change in a distance of the separating element from the sensor, wherein current flows in the electrically conductive coil due to a displacement of the metal rod in the electrically conductive coil.

* * * * *